United States Patent [19]

Usui

[11] Patent Number: 5,109,888
[45] Date of Patent: May 5, 1992

[54] HIGH-PRESSURE METALLIC PIPE PROVIDED WITH CONNECTING HEAD PART AND METHOD FOR FORMATION THEREOF

[76] Inventor: Masayoshi Usui, Numazu, Japan

[21] Appl. No.: 393,574

[22] Filed: Aug. 14, 1989

[30] Foreign Application Priority Data

Aug. 19, 1988 [JP] Japan .................................. 63-206027

[51] Int. Cl.$^5$ .............................................. F16L 9/00
[52] U.S. Cl. .................................... 138/109; 138/177; 138/178; 138/DIG. 11
[58] Field of Search ................. 138/109, 172, 177, 178, 138/143, 174, 98, 97, DIG. 11; 72/367; 285/405; 29/509, 510, 511, 516, 520

[56] References Cited

U.S. PATENT DOCUMENTS

| | | | |
|---|---|---|---|
| 4,080,782 | 3/1978 | Colecchio | 29/511 |
| 4,134,430 | 1/1979 | Mukasa et al | 138/109 |
| 4,193,333 | 3/1980 | Hallock | 29/509 |
| 4,266,577 | 5/1981 | Usui | 138/109 |
| 4,642,870 | 2/1987 | Schulz | 29/509 |
| 4,722,619 | 2/1988 | Reiser et al. | 29/509 |
| 4,784,311 | 11/1988 | Sugao | 29/516 |
| 4,864,711 | 9/1989 | Yokota | 29/511 |

FOREIGN PATENT DOCUMENTS 90846  1/1958  Norway .............................. 138/109

*Primary Examiner*—Timothy F. Simone
*Assistant Examiner*—Patrick F. Brinson
*Attorney, Agent, or Firm*—Anthony J. Casella; Gerald E. Hespos

[57] ABSTRACT

This invention provides a high pressure metallic pipe having at least one end thereof provided with a connecting head suitable for connection to a counter seat part and a method for shaping the connecting head. The high pressure metallic pipe according to this invention features a metallic ring embedded in a cavity formed therein at the time of buckling so that no cavity erosion due to the high pressure fluid flowing through the pipe takes place. Further, according to the method of this invention, one end of the thick metallic pipe, having a comparatively small outer diameter, is expanded by buckling, a metallic ring is inserted into the extended pipe end and the pipe end is pressed by a punch to form a connecting head with the metallic ring embedded therein.

10 Claims, 4 Drawing Sheets

PRIOR ART

HIGH-PRESSURE METALLIC PIPE PROVIDED WITH CONNECTING HEAD PART AND METHOD FOR FORMATION THEREOF

BACKGROUND OF THE INVENTION

1. Field of the Invention

This invention relates to a high-pressure metallic pipe provided with a connecting head part and formed of a steel pipe of a relatively small diameter and a thick wall, frequently used as a conduit for the supply of a fuel in a diesel internal combustion engine like a high-pressure fuel injection pipe measuring approximately 4 to 20 mm in outside diameter and 1 to 8 mm in wall thickness and to a method for the formation of the connecting head part.

2. Description of the Prior Art

The conventional high-pressure metallic pipe provided with a connecting head part is illustrated in FIG. 10 or FIG. 11. The connecting head part (12) is of the shape of a truncated cone having as its seat surface (13) the outer peripheral surface at the terminal part of a thick-wall steel pipe (11). The connecting head part is shaped by a buckling work by the use of the pressure exerted externally by a punch member in the direction of the axis. In consequence of the buckling work due to the aforementioned pressure, the peripheral wall of the connecting head part is expanded outwardly, with the result that an annular pocket (15) (FIG. 10) or an annular notch (15') (FIG. 11) is formed on the inside of the head part. The metallic pipe thus configured is then put to use. The reference numeral (14) stands for a sleeve washer which is fitted behind the connecting head part (12).

The conventional high-pressure metallic pipe provided with a connecting head part and the method for the formation of this connecting head part, however, have entailed the problem that the annular pocket (15) or annular notch (15') inevitably formed inside the connecting head part causes a high-pressure fluid being forwarded through the pipe to induce the phenomenon of cavitation erosion in the pocket or notch and its vicinity.

SUMMARY OF THE INVENTION

This invention, conceived in the urge to solve the various problems of the prior art mentioned above, aims to provide a high-pressure metallic pipe provided with a connecting head part allowed to form a substantially flat and smooth inner peripheral surface in consequence of the work for the formation of the head part and, therefore, is prevented from the trouble of cavication erosion inside the head part. The invention also is directed to a method for the formation of the head part.

To accomplish the object described above, this invention is essentially directed to a high-pressure metallic pipe provided with a connecting head part comprising a steel pipe of a relative small diameter and a large wall thickness, a connecting head part formed in the connecting end part of the steel pipe and possessed of an outer peripheral surface adapted as a seat surface of the shape of a truncated cone or a truncated circular arc fitting a counter seat part, optionally a washer attached behind the connecting head part, and a metallic ring member buried in an annularly grooved part occurring inside the head part in consequence of the formation of the connecting head part so as to convert the grooved part into a smooth inner peripheral surface. The invention also is directed to a method for the formation of a connecting head part in a high-pressure metallic pipe, which method comprises cutting a steel pipe of a relatively small diameter and a large wall thickness in a prescribed length, setting the length of the steel pipe fast in place with the neighborhood of the connecting end part thereof held in a chuck and the leading end part thereof left as a margin for the connecting head part, optionally with a washer attached as required, radially expanding the margin of the pipe for the formation of head part by an externally pressing work performed by the use of a mandrel member and, at the same time, burying a metallic ring member of a desired cross section inside the radially expanded part of the pipe, and thereafter pressing the peripheral wall part of the radially expanded part of the pipe inwardly relative to the direction of the axis by the use of a punch member provided with a die conforming to the contour of the head part thereby effecting the formation of a head part having an outer peripheral surface adapted as a seat surface of the shape of a truncated cone or a truncated circular arc fitting a counter seat part and giving to the formed head part a flat smooth inner peripheral surface underlain by the metallic ring member.

This invention concerns the high-pressure metallic pipe provided with the connecting head part and the method for the formation of this head part. When the connecting head part is formed in such a manner as to have a metallic ring member buried inside the head part by the work of radially expanding the connecting end part of the pipe and by the use of the metallic ring member adapted to be buried inside the radially expanded pipe, therefore, the inside of the formed head part is a substantially flat and smooth inner peripheral surface. Thus the steel pipe no longer has the possibility of cavitation erosion due to the pressure of a fluid inside the pipe.

DETAILED DESCRIPTION OF PREFERRED EMBODIMENTS

Figure 1:
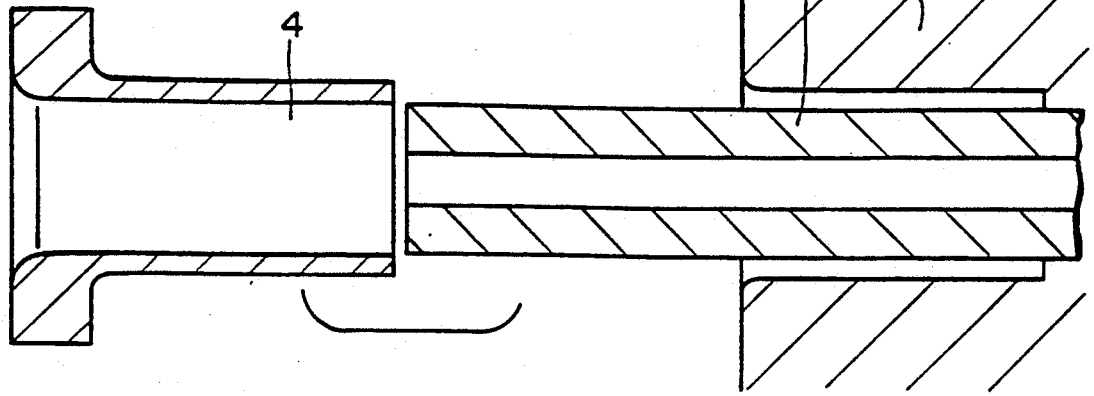
FIG. 1, FIG. 2, FIG. 3, FIG. 4, and FIG. 5 are longitudinal cross sections as explanatory diagrams for illustrating a sequential flow of component work steps involved in the method for the formation of a high-pressure metallic pipe provided with a connecting head part and the method for the formation of the head part, as one embodiment of this invention.
Figure 2:
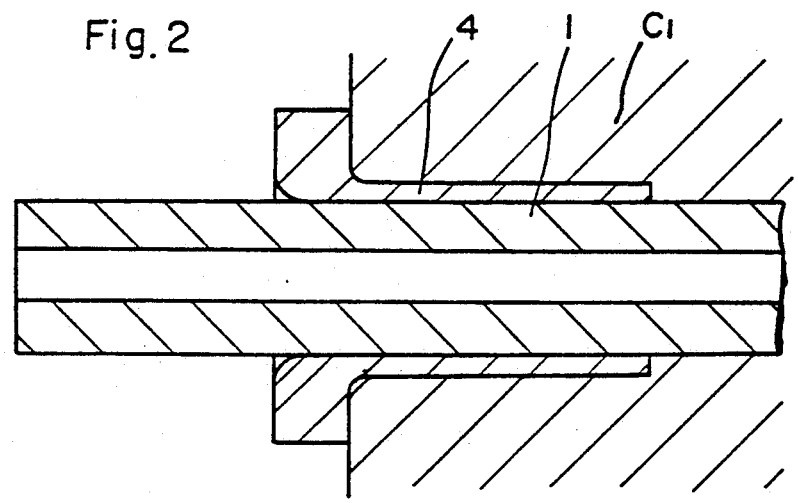
Figure 3:
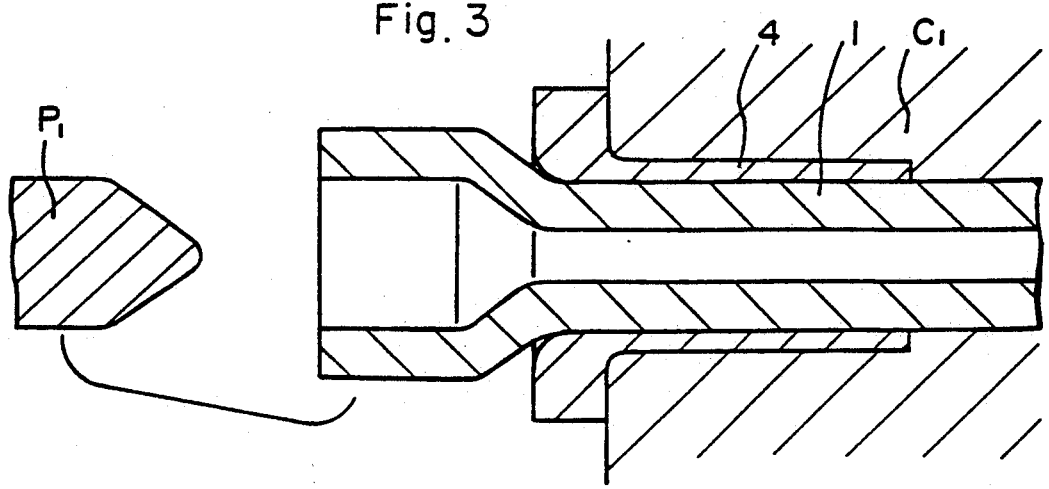
Figure 4:
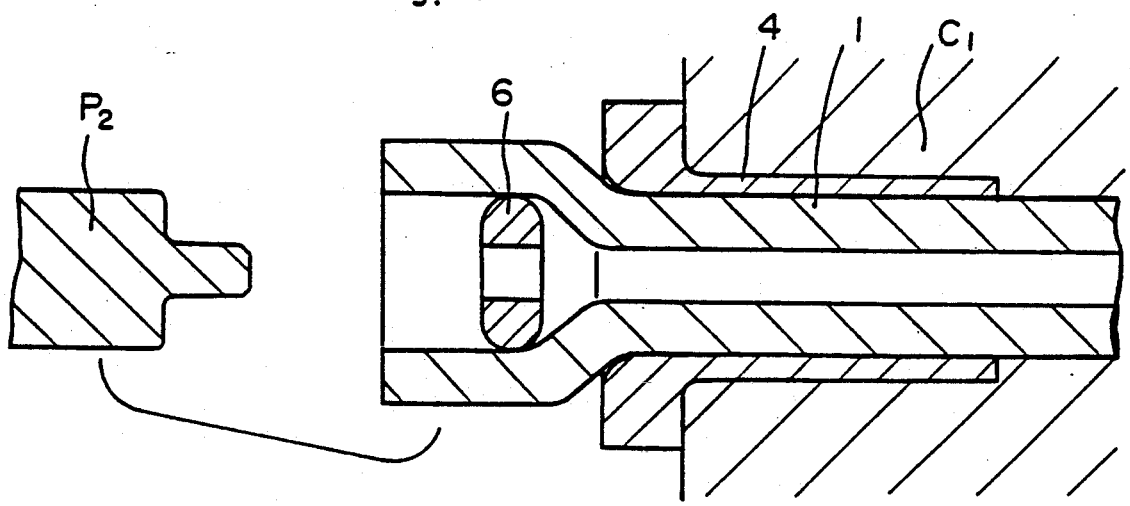

With reference to FIG. 1 to FIG. 9, (1) stands for a steel pipe of a large wall thickness, specifically a high-pressure pipe of carbon steel cut in a prescribed length and measuring approximately 4 to 20 mm in outside diameter and 1 to 8 mm in wall thickness. A sleeve washer (4) is attached (FIG. 1) near the connecting end part, with a margin left in the leading end part for the formation of a connecting head part. As the cut length of the pipe is set in place with the attaching part side thereof held in a chuck (C₁) (FIG. 2), the marginal part of the pipe left for the formation of the head part is radially expanded outwardly by the use of a mandrel member (P₁) (FIG. 3). A metallic ring member (6) having a substantially semicircular cross section and measuring approximately 0.1 d to 0.5 d (d for the inside diameter of the steel pipe) in linear diameter or thickness is adapted to be subsequently buried inside the radially expanded pipe as incorporated from the open end side thereof in a holder (P₂) (FIG. 4).

Figure 5:
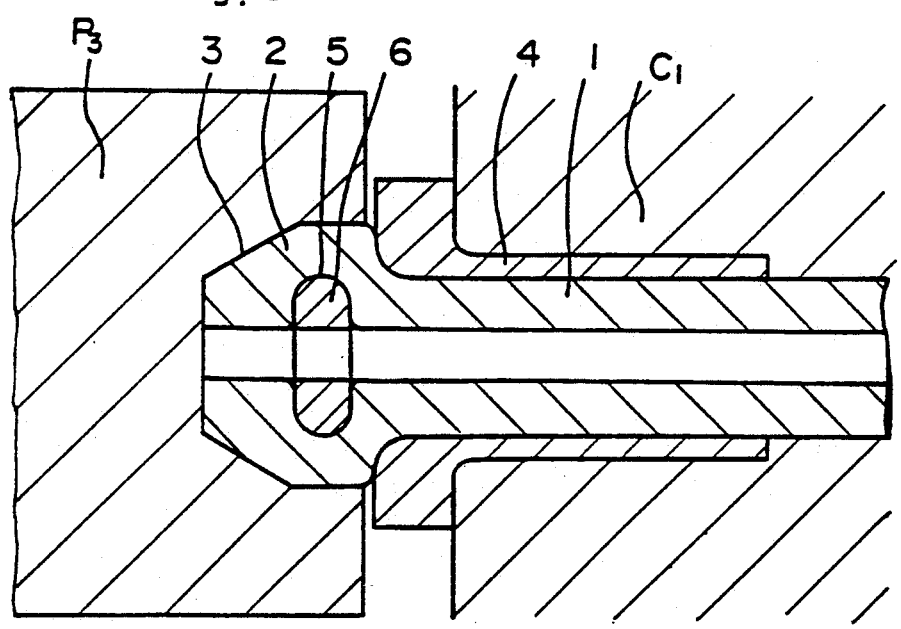
Figure 6A:
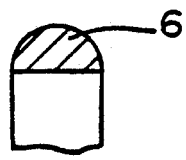
FIGS. 6 (A), (B), and (C) are partially cutaway cross sections illustrating varying embodiments using metallic ring members differing in cross-sectional shape.
Figure 6B:
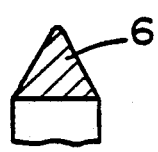
Figure 6C:
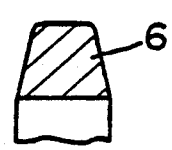
Figure 7:
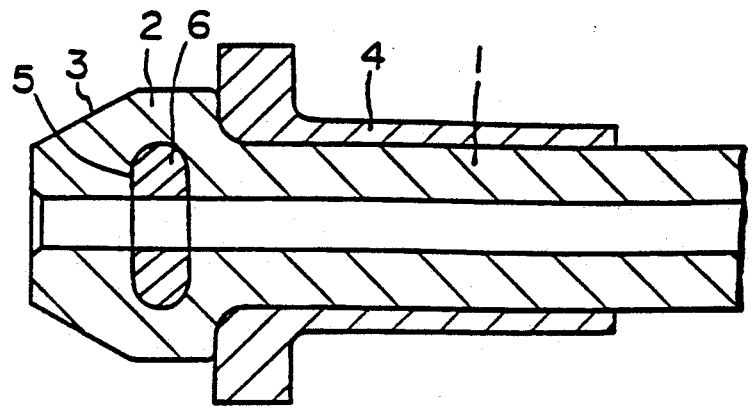
FIG. 7 is a cross section of the high-pressure metallic pipe obtained by the method of FIG. 1 to FIG. 5.

The cross section of the metallic ring (6) is not limited to the substantial semicircle [FIG. 6 (A)] but may be formed in a desired shape such as, for example, a substantial triangle [FIG. 6 (B)] or a substantial trapezoid [FIG. 6 (C)]. Thereafter, the peripheral wall part of the radially expanded tube is pressed inwardly relative to the direction of the axis by the use of a punch member (P₃) provided with a die conforming to the contour of a head part to effect the formation of a head part having the outer peripheral surface adapted as a seat surface (3) of the shape of a truncated cone fitting a counter seat part (not shown) (FIG. 5). Since the aforementioned metallic ring member (6) is consequently buried as positioned in annularly grooved part (5), there is formed a connecting head part (2) possessing a flat smooth inner peripheral surface. In this manner, the high-pressure metallic pipe configured as illustrated in FIG. 7 is obtained. The material for the metallic ring member (6) is selected from among materials softer than the main body of the steel pipe (1) in due consideration of ready conformity to the contour of the groove (5) part or from among materials harder than the main body in due consideration of wear resistance in the peripheral surface confronting the contour of the groove.

Figure 8:
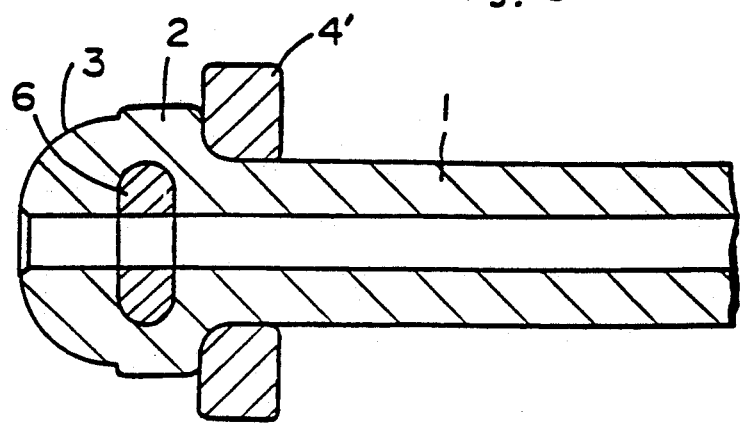
FIG. 8 and FIG. 9 are cross sections of high-pressure metallic pipes as other embodiments of the present invention.
Figure 9:
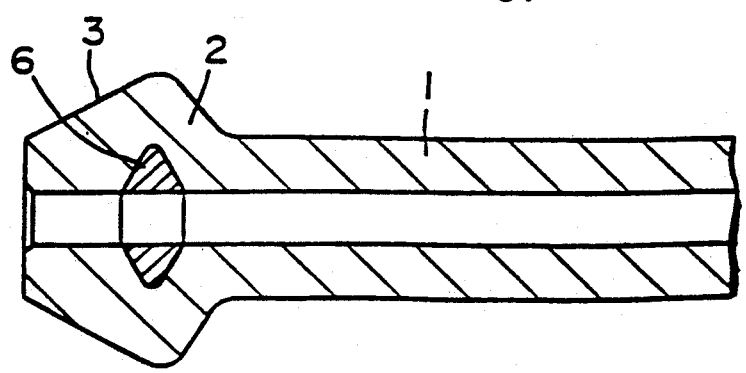
Figure 10:
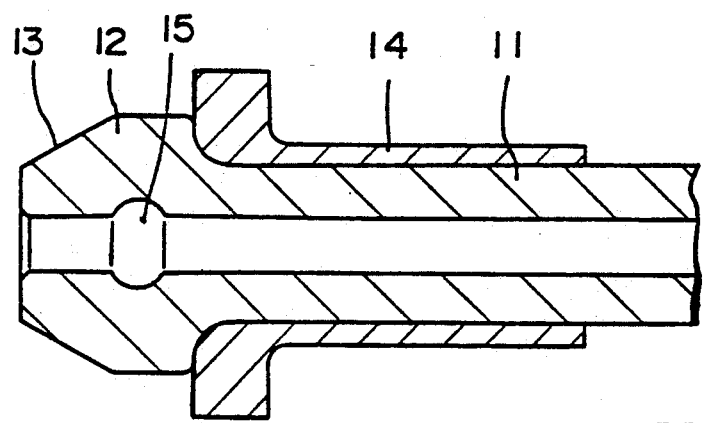
FIG. 10 and FIG. 11 are longitudinal cross sections illustrating connecting head parts formed by the conventional methods for the formation of a head part.
Figure 11:
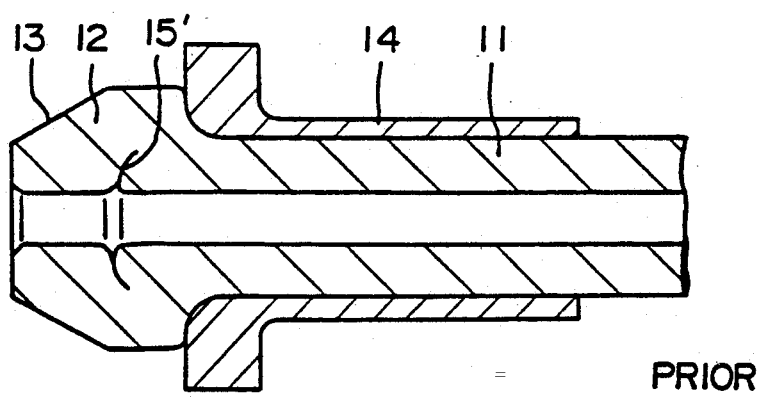

Further, in accordance with the present invention, the connecting head part (2) possessing a seat surface (3) of the shape of a truncated circular arc may be formed by the attachment of a ring washer (4') illustrated in FIG. 8 instead of the sleeve washer (4). Otherwise, the connecting head part (2) of the shape of a bead of an abacus may be formed without the attachment of any washer (4, 4') as illustrated in FIG. 9.

The high-pressure metallic pipe provided with the connecting head part and the method for the formation of the head part contemplated by the present invention are as described above. Since the connecting head part (2) is configured in such a manner that the metallic ring member is buried inside the head part by the work of radially expanding the connecting end part of the steel pipe and by the use of the metallic ring member (6) adapted to be buried inside the radially expanded pipe, the annularly grooved part (5) inevitably occurring inside the head part in consequence of the formation of this head part can be converted into a substantially flat smooth inner peripheral surface as underlain by the buried metallic ring member. Thus, the produced high-pressure metallic pipe precludes the possibility of entailing the phenomenon of cavitation erosion by the fluid pressure inside the tube. The metallic pipe is highly useful.

What is claimed is:

1. A high-pressure metallic pipe, comprising a steel pipe of relatively small outer diameter and a large wall thickness defining an inner diameter and a substantially smooth inner peripheral surface, a connecting head part formed at an end of said steel pipe, said connecting head part comprising a radially outwardly formed rear wall facing portions of the steel pipe adjacent the connecting head and a seat surface extending unitarily inwardly from the rear wall at the end of the pipe such that an annular groove extends outwardly from the inner peripheral surface of the head part intermediate the rear wall and the seat surface, and a metallic ring member buried in the annular groove inside said head part, said metallic ring member having an inner diameter equal to the inner diameter of the steel pipe and serving to convert said annularly grooved part into a substantially flat and smooth inner peripheral surface to avoid cavitation erosion due to fluid flowing inside the pipe.

2. A pipe according to claim 1, wherein said seat surface is in the shape of a truncated cone.

3. A pipe according to claim 1, wherein a sleeve washer is attached behind said connecting heat part.

4. A pipe according to claim 1, wherein said metallic ring member possesses a cross section of the shape of a substantial semicircle.

5. A pipe according to claim 4, wherein said metallic ring member possesses an axial thickness in the range of 0.1 d to 0.5 d, wherein d stands for the inside diameter of said steel pipe.

6. A pipe according to claim 1, wherein said steel pipe possesses an outside diameter in the range of 4 to 20 mm and a wall thickness in the range of 1 to 8 mm.

7. A pipe according to claim 1, wherein said seat surface is in the shape of a truncated circular arc.

8. A pipe according to claim 1, wherein said metallic ring member possesses a cross-section in the shape of a substantial triangle.

9. A pipe according to claim 1, wherein said metallic ring member possesses a cross-section in the shape of a substantial trapezoid.

10. A pipe according to claim 1, wherein a ring washer is attached behind said connecting head part.

* * * * *